UNITED STATES PATENT OFFICE.

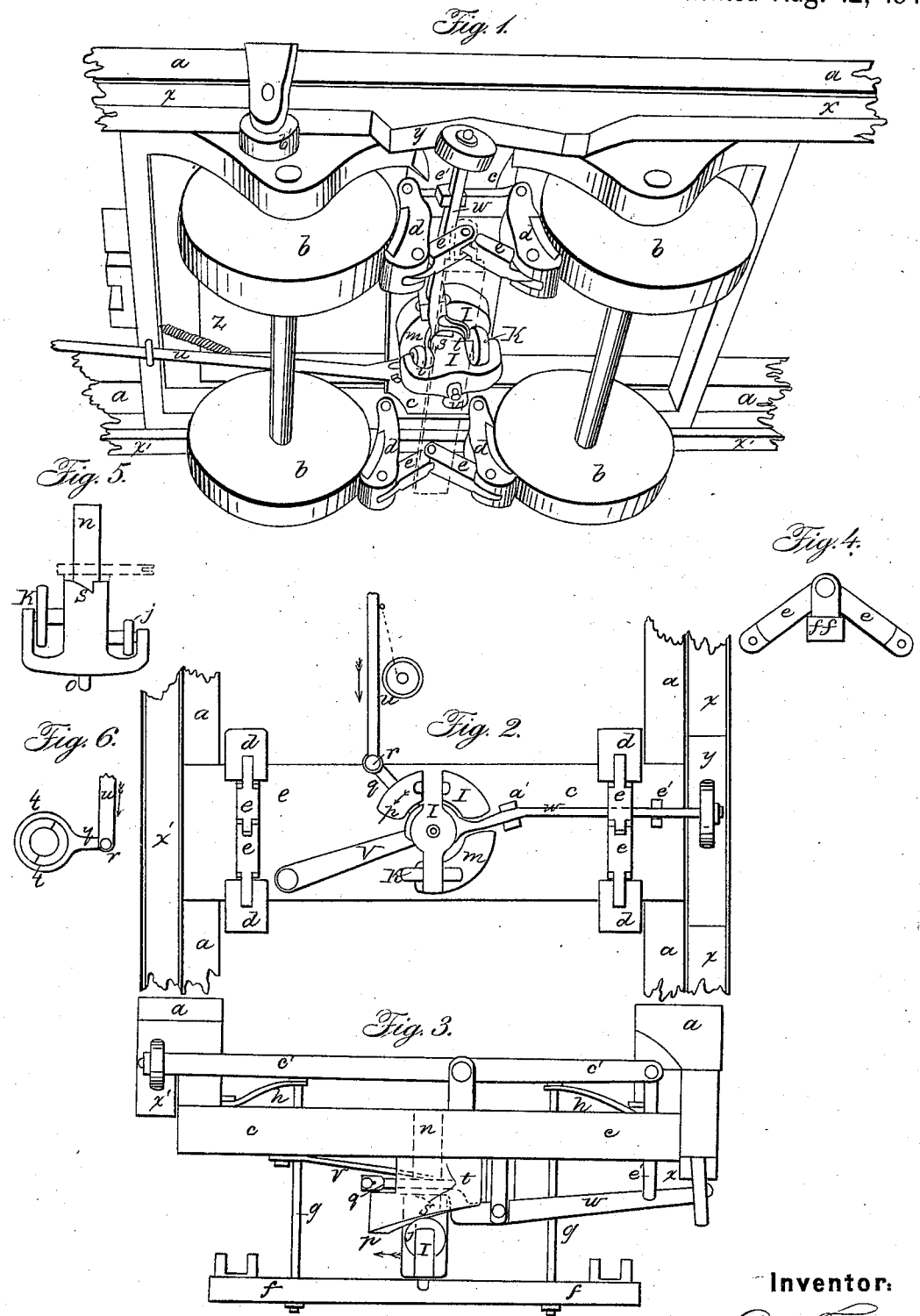

EDWIN THAYER, OF CHATHAM, NEW YORK.

BRAKE FOR CARS.

Specification of Letters Patent No. 4,690, dated August 12, 1846.

*To all whom it may concern:*

Be it known that I, EDWIN THAYER, of Chatham, in the county of Columbia and State of New York, have invented a new and useful Self-Acting Brake for Railroad-Wheels; and I do hereby declare that the following is a full, clear, and exact description of the construction and operation thereof, reference being had to the accompanying drawings, making part of this specification.

Although my brakes are applicable to the wheels of passenger cars, yet they are adapted more particularly to those of cars employed in the transportation of freight; the object of my invention being to dispense wholly or in a great measure with the employment of brakemen and to prevent accidents arising from heavy trains becoming unmanageable in descending steep grades. This object I effect by constructing my braking apparatus in such manner that when the speed of the engine shall be checked and each car of the train be consequently brought in contact with the one in advance of it, the act of striking or the pressure shall cause the brake to be applied to the wheels, an apparatus being moreover provided, by which the engine driver can at pleasure cause the brakes to cease to act; as for instance, when a train is to be backed.

In the drawings the same letters refer to the same parts in all the figures.

Figure 1 is a perspective view of a set of wheels with my braking apparatus attached. Figs. 2, 3, 4, 5, and 6 are views of detached parts.

$a\ a\ a\ a$ is a portion of a car frame; $b\ b\ b\ b$, the wheels; $c\ c$, a cross piece which supports the braking apparatus; $d\ d\ d\ d$, the rubbers for producing friction upon the wheels; $e\ e\ e\ e$, toggle joints acting upon the rubbers; $f, f$, a cross bar shackled to the elbows of the toggles (see Figs. 3 and 4) and suspended by the iron rods $g\ g$ from the outer ends of two springs $h\ h$, situated upon the upper side of the cross piece $c\ c$. These springs when uncompressed, maintain the cross bar $f\ f$ and the toggle joints thereto attached, in the position shown in Fig. 4 the elbow being bent, and the rubbers consequently withdrawn from the rings of the wheels. The depression of the cross bar upon the other hand tends to straighten the toggle and bring the rubbers against the wheels. This depression is produced by the swivel $i$ with its friction rollers $j, k$, acting upon the curved inclined planes $l, m$. This swivel is maintained in its position by its spindle $n$ (see Fig. 5, also the dotted lines in Fig. 3) which moves in a hole pierced in the cross piece $c\ c$, and by the pivot $o$, which plays in the cross bar $f\ f$. It has thus a vertical motion as well as that of revolution about its own axis. It will be readily seen that by turning the swivel about its own axis in the direction of the arrows (see Fig. 3) the progression of the roller $j$ toward the extremity $p$ of the plane, will cause the cross bar $f\ f$ to be depressed and consequently bring the rubbers against the wheels.

Fig. 6 is a ring of metal which slips upon the spindle $n$. It has upon its lower face, two clutch teeth $t\ t$, which drop into corresponding ones $s$ &c. in the swivel. A short arm or lever $q$ is attached to one side of this ring and is jointed at $r$ to a rod $u$ which projects beyond the frame of the car. It will be seen that by pushing back the rod $u$ in the direction of the arrows, the clutch teeth upon the ring Fig. 6 act upon those of the swivel and cause the latter to turn upon its axis. The object of the spring $v$ (Figs. 2 and 3) beneath the ring Fig. 6 is to keep the clutch teeth of this latter and the swivel locked together. When by slacking the speed of the engine, the cars are brought together, the outer end of the rod $u$ will strike against the frame of the car ahead, thus causing the rod to be pushed backward in direction of the arrow and by turning the swivel, apply the rubbers to the wheels. When a train is to be backed, it becomes necessary to suspend the action of the brakes. To effect this it is only necessary to disengage the clutch teeth $t\ t$, $s$ &c. The ring Fig. 6 then merely turns about the spindle $n$ without acting upon the swivel. This disengagement is effected by means of the lever $w$, the inner forked end of which acts against the under surface of the ring Fig. 6, forcing this latter upward against the spring and lifting the teeth of the ring clear of those of the swivel. The fulcrum of the lever $w$ is at $a'$. To bring this disengaging apparatus within the control of the engine driver, I employ a series of wooden rods $x\ x$, lying along the sides of the car frames and running upon friction rollers $b'$, attached thereto, as represented in Fig. 1. The length of the rods corresponds with that of the cars and their ends are in contiguity; so that when the forward rod is thrust backward, the whole series move in the same direction. Upon each of these rods and directly over the outer end of the lever $w$, is fastened a wedge shaped piece of wood $y$, forming an inclined plane, a friction roller is secured upon the outer end of $w$; and it will be easily seen that when the rod $x$ $x$ is thrust in the direction of the arrows, the wedge shaped piece $y$ will act upon the lever and disengage the clutch teeth $t$ $t$, $s$ &c., as before described.

A spring $z$, one end of which is attached to the frame of the car and, the other to the rod $u$, serves to restore the several parts to their original position, after the pressure is removed.

In order that the disengagement of the clutch teeth may be effected from either side, a counter lever $c'$ $c'$ is added above the cross piece $c$, $c$, having its fulcrum at $d'$, and acting upon the lever $w$ by means of a stud $e'$ hinged to one end and playing in a mortise made through the cross piece $c$ $c$, see Figs. 2 and 3. The rods $x'$ $x'$ which actuate the counter lever are precisely similar in their construction and operation to those upon the other side of the car as before described. To render my braking apparatus capable of being worked by hand it is only necessary to connect a chain from the barrel of the ordinary capstan with the rod $u$, as shown in Fig. 2.

What I claim as my invention and desire to secure by Letters Patent is,

1. The combination of the cross bar $f$ $f$ shackled to the elbows of the toggles; the swivel $i$; the curved inclined planes $l$ and $m$; the ring Fig. 6 with its lever, and the rod $u$ projecting in front of the car, the whole being arranged and operating in the manner herein described, and forming a self-acting braking apparatus.

2. I also claim the forked lever $w$; the counter lever $c'$ $c'$, and the stud $e'$; together with the rods $x$ $x$, $x'$ $x'$ carrying the inclined planes or wedge shaped pieces $y$; as also the spring $v$ acting upon the ring Fig. 6, and serving to keep the clutch teeth engaged; the several parts being combined and operating in the manner, and for the purpose, herein set forth and described forming a disengaging apparatus.

EDWIN THAYER.

Witnesses:
Wm. S. Ellison,
Chas. H. Hazen.